(12) United States Patent
Willis (10) Patent No.: US 7,843,924 B2
(45) Date of Patent: Nov. 30, 2010

(54) METHOD AND SYSTEM FOR SENDING RETURN MESSAGES IN MPLS NETWORKS

(75) Inventor: Peter J Willis, Ipswich (GB)

(73) Assignee: British Telecommunications public limited company, London (GB)

(*) Notice: Subject to any disclaimer, the term of this patent is extended or adjusted under 35 U.S.C. 154(b) by 1247 days.

(21) Appl. No.: 10/483,067

(22) PCT Filed: Jul. 26, 2002

(86) PCT No.: PCT/GB02/03425

§ 371 (c)(1),
(2), (4) Date: Jan. 7, 2004

(87) PCT Pub. No.: WO03/013075

PCT Pub. Date: Feb. 13, 2003

(65) Prior Publication Data

US 2004/0174882 A1    Sep. 9, 2004

(30) Foreign Application Priority Data

Jul. 26, 2001    (GB)    .................................. 0118172.6

(51) Int. Cl.
*H04L 12/28* (2006.01)
*H04L 12/56* (2006.01)
*G06F 15/173* (2006.01)

(52) U.S. Cl. .................. 370/392; 370/395.21; 370/400; 709/238

(58) Field of Classification Search .................. 370/392, 370/395.21, 400; 709/238
See application file for complete search history.

(56) References Cited

U.S. PATENT DOCUMENTS

| 5,996,021 A | * | 11/1999 | Civanlar et al. | ............. | 709/238 |
| 6,678,264 B1 | * | 1/2004 | Gibson | ....................... | 370/352 |
| 6,680,943 B1 | * | 1/2004 | Gibson et al. | ............... | 370/392 |
| 6,697,361 B2 | * | 2/2004 | Fredette et al. | ............. | 370/389 |
| 6,771,645 B1 | * | 8/2004 | Sasagawa et al. | ........... | 370/392 |

(Continued)

FOREIGN PATENT DOCUMENTS

WO    WO 01/29685    4/2001

OTHER PUBLICATIONS

S.M. Shahrier, "A Bi-Directional LSP Tunneling Architecture for MPLS", Internet Draft, Jun. 2001, pp. 1-4, from http://www3.ietf.org/proceedings/02mar/I-D/draft-shahrier-mpls-lsp-00.txt.*

(Continued)

*Primary Examiner*—Alpus H Hsu
(74) *Attorney, Agent, or Firm*—Nixon & Vanderhye P.C.

(57) ABSTRACT

A method for sending a message via a label switch telecommunications network, in particular an MPLS network. The method comprises identifying at a first router an input label attached to the message and using the first label to identify a output label that defines a forward path for the message. This is done by reading the label table in the router. Once the output label is identified, the input label is replaced with the output label and the message and the output label together are sent to another node of the network. When a return message is to be sent, input labels for the forward message path are used as output labels for the return message path.

16 Claims, 9 Drawing Sheets

U.S. PATENT DOCUMENTS

| | | | |
|---|---|---|---|
| 6,856,991 B1 * | 2/2005 | Srivastava | 1/1 |
| 6,965,572 B1 | 11/2005 | Boodaghians | |
| 6,973,057 B1 * | 12/2005 | Forslow | 370/328 |
| 7,298,693 B1 * | 11/2007 | Owens et al. | 370/216 |
| 7,342,874 B2 * | 3/2008 | Pegrum et al. | 370/218 |
| 7,463,591 B1 * | 12/2008 | Kompella et al. | 370/248 |
| 2002/0054405 A1 * | 5/2002 | Guo et al. | 359/118 |
| 2003/0088699 A1 * | 5/2003 | Luciani et al. | 709/243 |
| 2004/0114595 A1 * | 6/2004 | Doukai | 370/389 |

OTHER PUBLICATIONS

Chang et al., "A Path Protection/Restoration Mechanism for MPLS Networks", IETF Draft, Nov. 2000, pp. 1-24, from http://tools.ietf.org/html/draft-chang-mpls-path-protection-02.*

Nortel Networks, "MPLS—An introduction to multiprotocol label switching," (Apr. 2001), 13 pgs.

General DataComm, "A Management Briefing on *Self-Healing ATM Networks*," (1997), 10 pgs.

Huang et al., "A Path Protection/Restoration Mechanism for MPLS Networks," (Mar. 2000), 15 pgs.

Huang et al., "A Path Protection/Restoration Mechanism for MPLS Networks," (Jul. 2000), 21 pgs.

Owens et al., "A Path Protection/Restoration Mechanism for MPLS Networks," (Nov. 2000), 22 pgs.

Owens et al., "A Path Protection/Restoration Mechanism for MPLS Networks," (Jul. 2001), 21 pgs.

Huang et al., "Extensions to RSVP-TE for MPLS Path Protection," (Jun. 2000), 10 pgs.

Sharma et al., "Extensions to RSVP-TE for MPLS Path Protection," (Nov. 2000), 8 pgs.

Owens et al., "Extensions to RSVP-TE for MPLS Path Protection," (Jul. 2001), 12 pgs.

Harrison et al., "OAM Functionality for MPLS Networks," (Feb. 2001), 28 pgs.

Harrison et al., "Requirements for OAM in MPLS Networks," (May 2001), 7 pgs.

Sharma et al., Framework for MPLS-based Recovery (Mar. 2001), 31 pgs.

Sharma et al., Framework for MPLS-based Recovery (Nov. 2000), 35 pgs.

Sharma et al., Framework for MPLS-based Recovery (Sep. 2000), 30 pgs.

Sharma et al., Framework for MPLS-based Recovery (Jul. 2001), 31 pgs.

Krishnan et al., "Extensions to RSVP to Handle Establishment of Alternate Label-Switched Paths for Fast Re-route," (Jun. 1999), 6 pgs.

Haskin et al., "A Method for Setting an Alternative Label Switched Paths to Handle Fast Reroute," (Nov. 2000), 9 pgs.

Haskin et al., "A Method for Setting an Alternative Label Switched Paths to Handle Fast Reroute," (May 2000), 9 pgs.

Blais, "Re: (oldies question) ATM connection full duplex?," Cell Relay Archive, (Dec. 2000), 2 pgs.

Thomas, Stephen A., "IPng and the TCP/IP Protocols: Implementing the Next Generation Internet", Copyright © 1996 by John Wiley & Sons, Inc. (pp. 375-403).

\* cited by examiner

| Input Interface | Input Label | Output Interface | Output Label |
|---|---|---|---|
| A | $L_0'$ | B | $L_1'$ |
| C | — | B | $L_1$ |

Label Table for Source Router

Figure 4

| Input Interface | Input Label | Output Interface | Output Label |
|---|---|---|---|
| D | $L_1$ | F | $L_2$ |
| D | $L_1'$ | F | $L_2'$ |
| ⋮ | ⋮ | ⋮ | ⋮ |

Label Table for LSR 4

Figure 5

| Input Interface | Input Label | Output Interface | Output Label |
|---|---|---|---|
| G | $L_2$ | H | — |
| G | $L_2'$ | I | $L_3'$ |

Label Table for Sink/Egress Router

METHOD AND SYSTEM FOR SENDING RETURN MESSAGES IN MPLS NETWORKS

This application is the U.S. national phase of international application PCT/GB02/03425 filed 26 Jul. 2002 which designated the U.S. and claims benefit of GB 0118172.6, dated Jul. 26, 2001, the entire content of which is hereby incorporated by reference.

FIELD OF TECHNOLOGY

The present invention relates to a telecommunications network that uses a label switching protocol, in particular a multiprotocol label switching network, and a method of sending messages via such a network.

BACKGROUND

Figure 1:
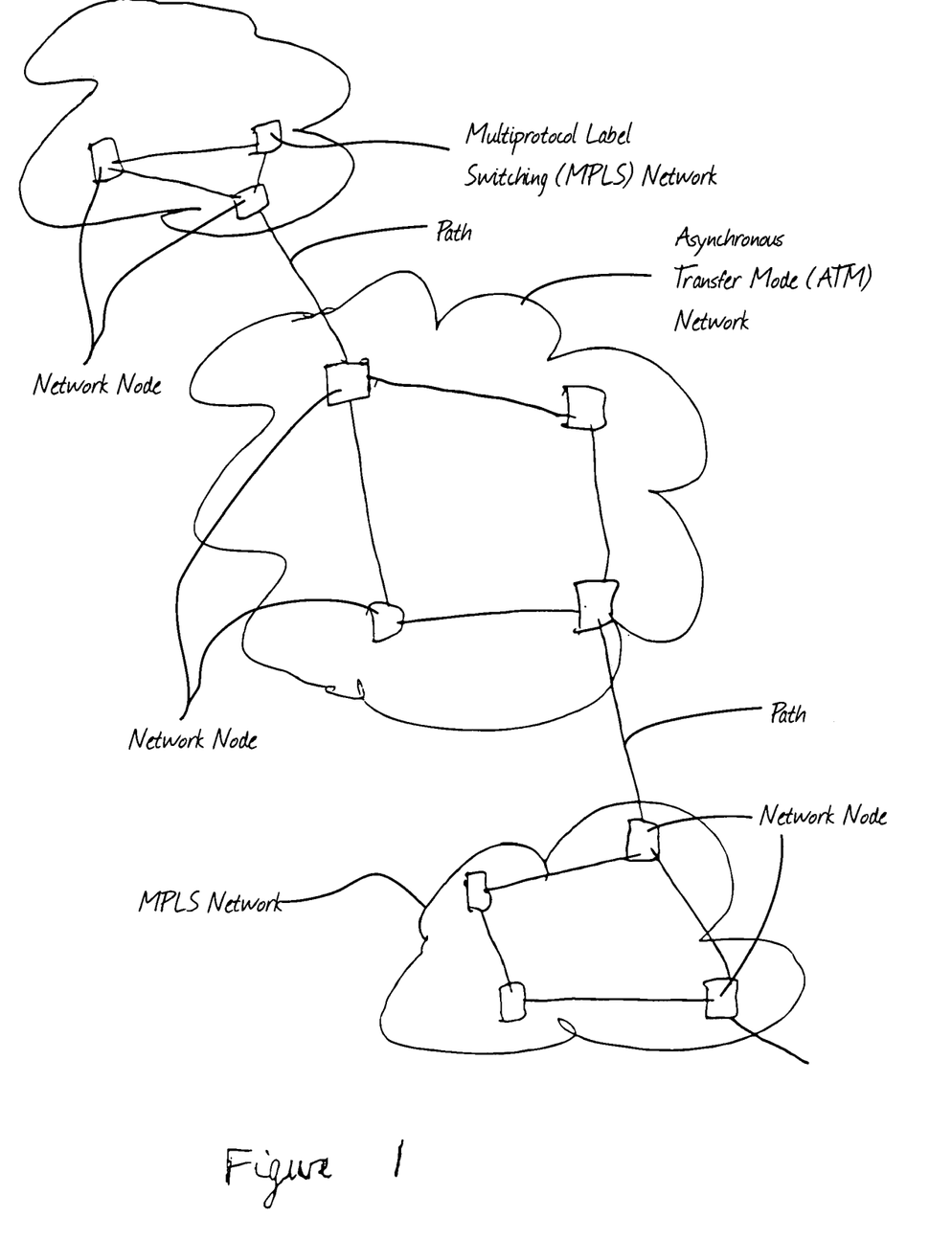
FIG. 1 shows in schematic form interconnected MPLS and ATM networks.
Figure 2:
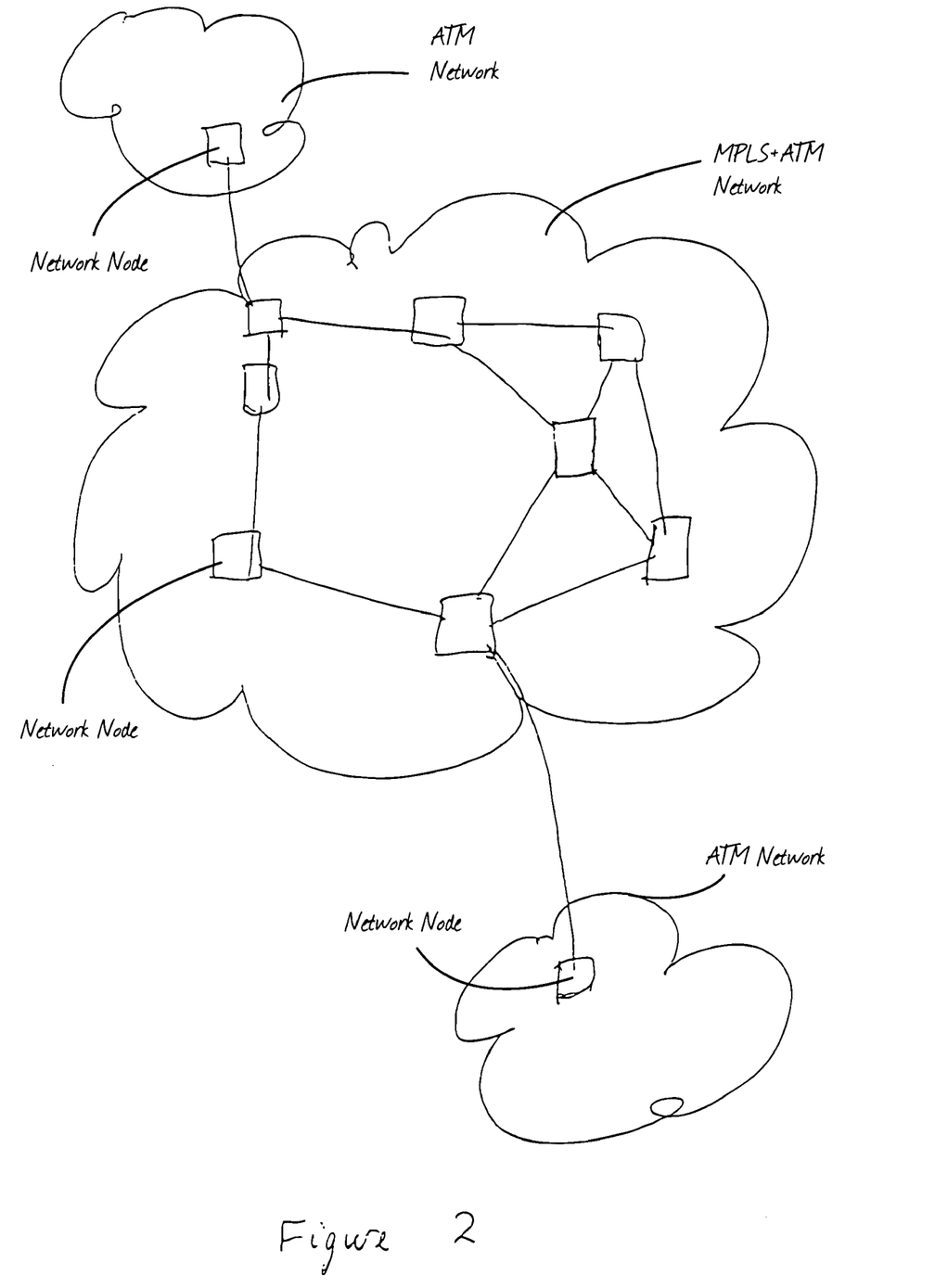
FIG. 2 shows an MPLS network superimposed over part of a ATM network.

Multiprotocol label switching (MPLS) is a new protocol that is being developed by the Internet Engineering Task Force (IETF) in order to improve the speed and accuracy of internet communications. The IETF defines MPLS as a standards based label switching technology for large-scale networks. An MPLS network can be a standalone, dedicated network or it can interface with a larger telecommunications network, such as an ATM network, as shown in FIG. 1. Alternatively, an MPLS network could be superimposed over part of an ATM network as shown in FIG. 2.

MPLS networks typically use standard IP addresses to determine the desired destination of a message that enters a source node of the MPLS network. Once this is done, a label is attached to the message, which label defines the MPLS forward path. A data packet that includes the message and label combination then enters the MPLS network and is forwarded to a router that is defined by the label. At the router, the attached label is used to determine the next router to which the message has to be forwarded. Routers that support MPLS are typically referred to as label switched routers (LSR). The label switch mechanism for determining the forward path for the message will be described in more detail with reference to FIGS. 3 to 7.

Figure 3:
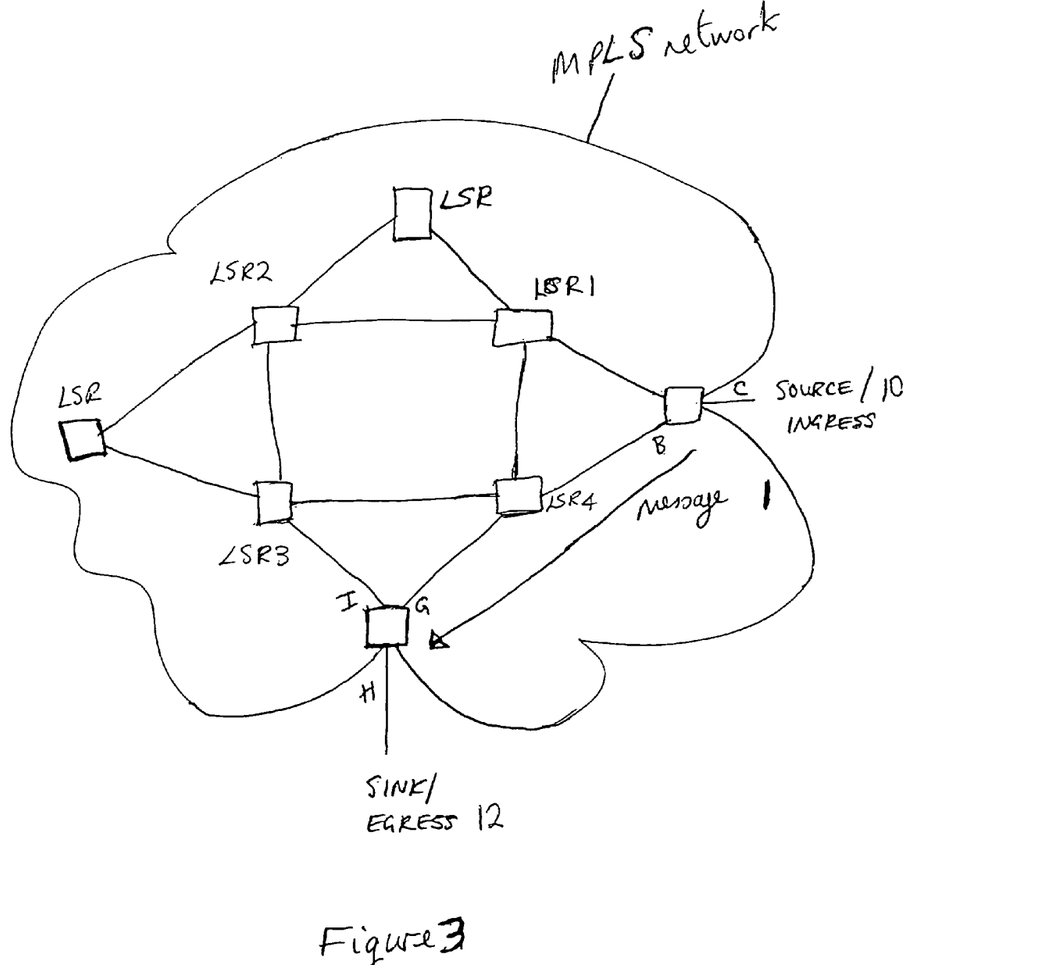
FIG. 3 shows an MPLS network with label switched routers (LSR) at network nodes.
Figure 4:
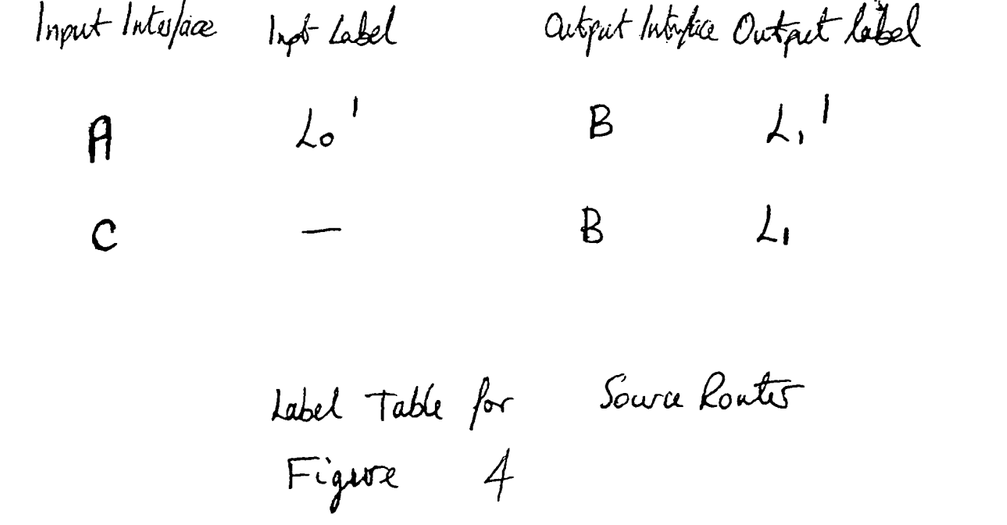
FIG. 4 shows an example of a label table for the routers shown in FIG. 3.
Figure 5:
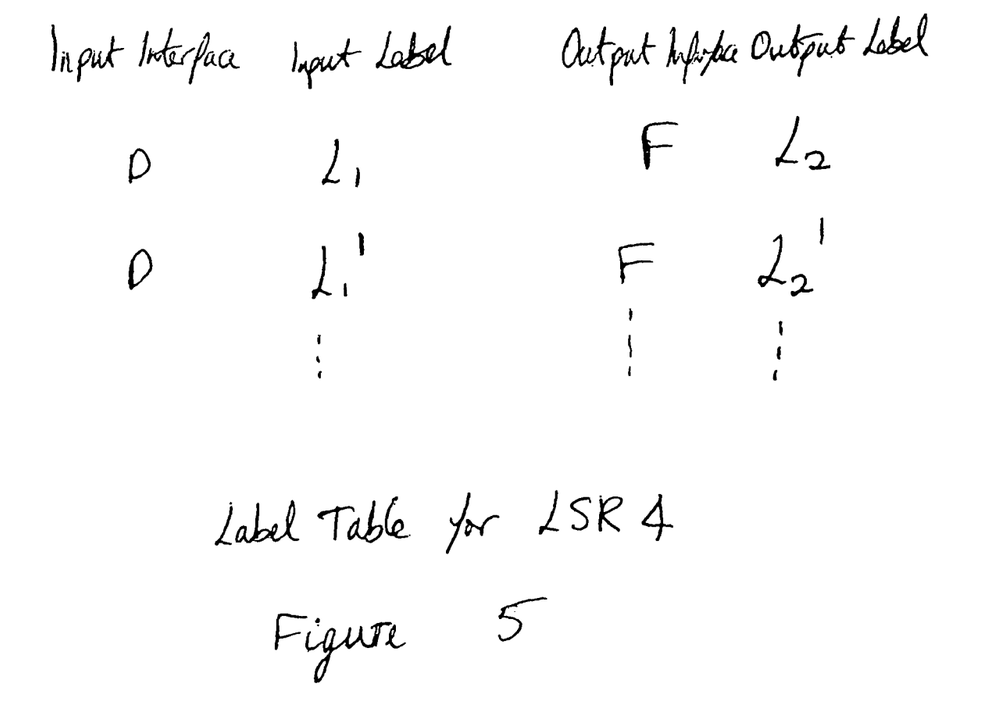
FIG. 5 shows another example of a label table for the routers shown in FIG. 3.
Figure 6:
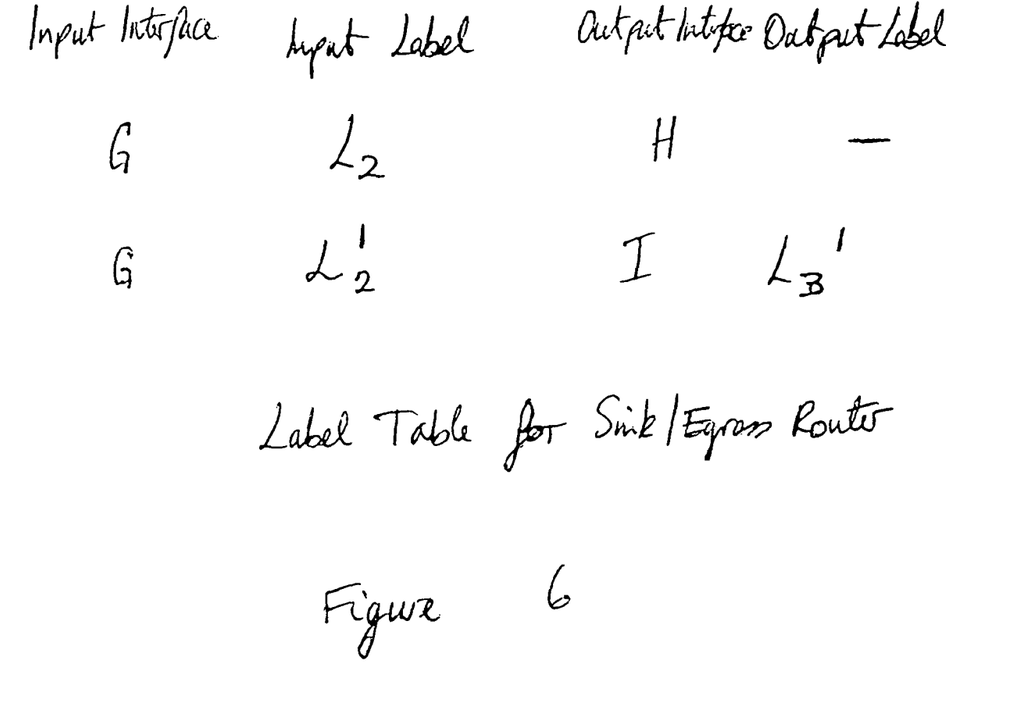
FIG. 6 shows yet another example of a label table for the routers shown in FIG. 3.
Figure 7:
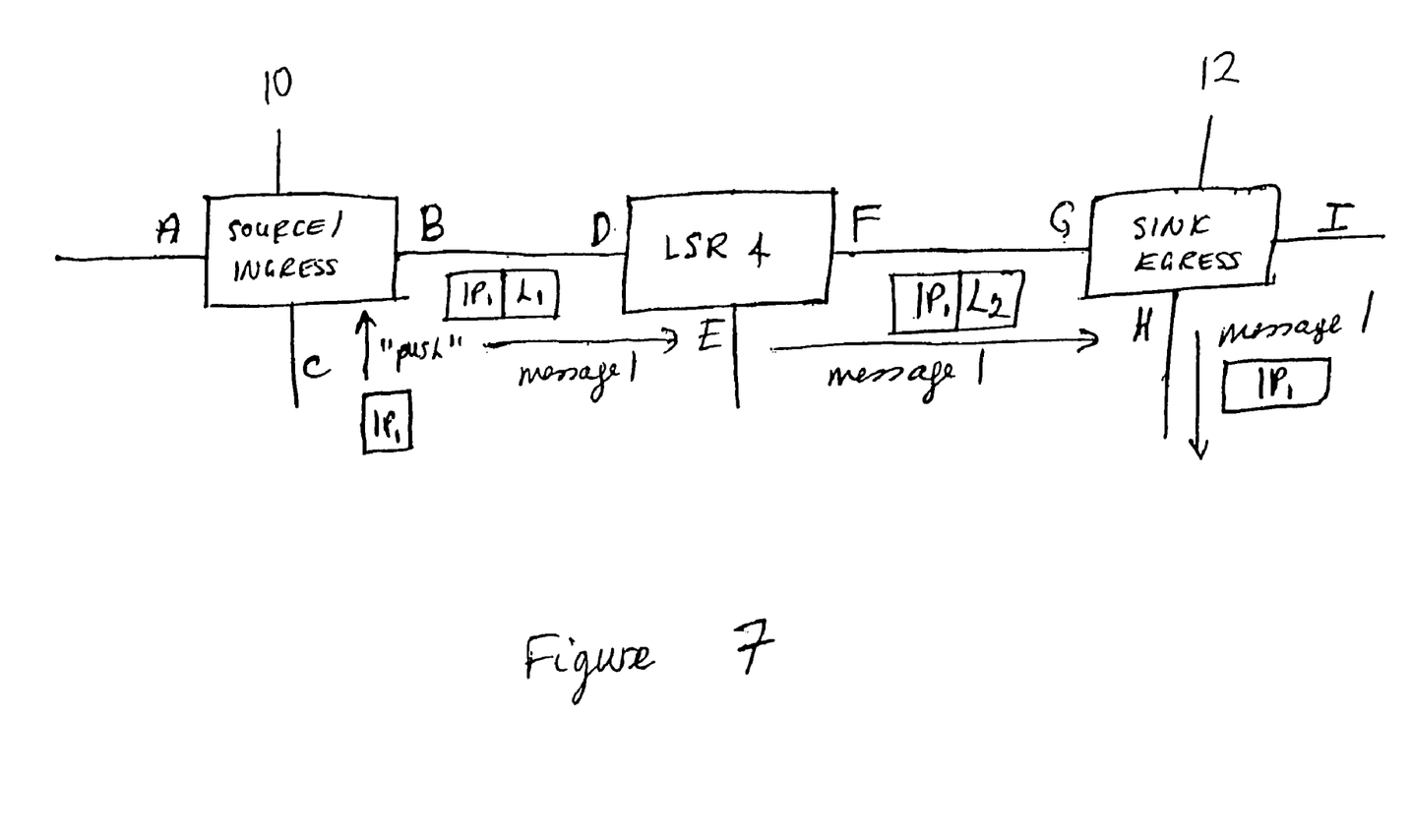
FIG. 7 shows in schematic form a message being received at the MPLS network of FIG. 3 from a non-MPLS network as not having a label.

FIG. 3 shows a multiprotocol label switch network that has a label switched router LSR1, LSR2, LSR3, LSR4 at each network node. Also provided are a source node 10 at which messages that originate from other networks can be introduced into the MPLS network and a sink node 12 at which messages can exit the MPLS network. Included in each label switched router LSR1, LSR2, LSR3, LSR4 is a table that defines the address of the next router in the forward path for the message. FIGS. 4 to 6 show examples of label tables for the source router 10, the router LSR4 and the sink router 12 respectively.

When a message is received at the source router 10, for example, message 1 of FIG. 3, the router 10 notes the interface at which it is received and checks whether there is a label attached. In the case of message 1, this is received at interface C of the source router 10 and is introduced from a non-MPLS network and so does not have a label, see FIG. 7. Receipt of message 1 at interface C causes software in the source router 10 to interrogate its label table to determine an output label for the message and so the next stage of its forward path. The software is operable to search the table to identify the relevant interface, in this case interface C, and then scan from left to right in order to identify the label that is attached to the message (NB in the case of message 1, there is no label). Once the label that is attached to the message is identified, the router software reads from left to right to identify the output interface and the output label for the forward message path. From FIG. 4, it can be seen that messages received at interface C with no label have to be output at interface B together with label $L_1$. Having consulted the label table, the source router 10 software causes message 1 to be output at interface B with label $L_1$. Messages output at interface B are passed to interface D of LSR4.

When message 1 is received at LSR4 a similar process is conducted to determine the forward path. As before, software in the router LSR4 looks at the label associated with the received message and consults its label table to determine the label that determines the forward path. From the label table of FIG. 5, it can be seen that messages received at interface D, and associated with an input label $L_1$ are to be output at interface F and the label $L_1$ is to be switched with label $L_2$. Having consulted the label table, the router software causes message 1 to be output at interface F with label $L_2$. Messages output at interface F are passed to interface G of the sink or egress router 12.

When message 1 is received at the sink router 12, it is interpreted to determine its label. Software in the sink router 12 then consults its label table to establish the label that determines the forward path. From the label table of FIG. 6, it can be seen that a message that is received at interface G with a label $L_2$, is to be output at interface H, with no label, i.e. the message is to leave the MPLS network. This is sometimes referred to as "popping" a label. Having consulted the label table of FIG. 6, the exit router software causes message 1 to be output at interface H without a label. In this way, a forward message path through the MPLS network is defined by a label switching process.

Figure 8:
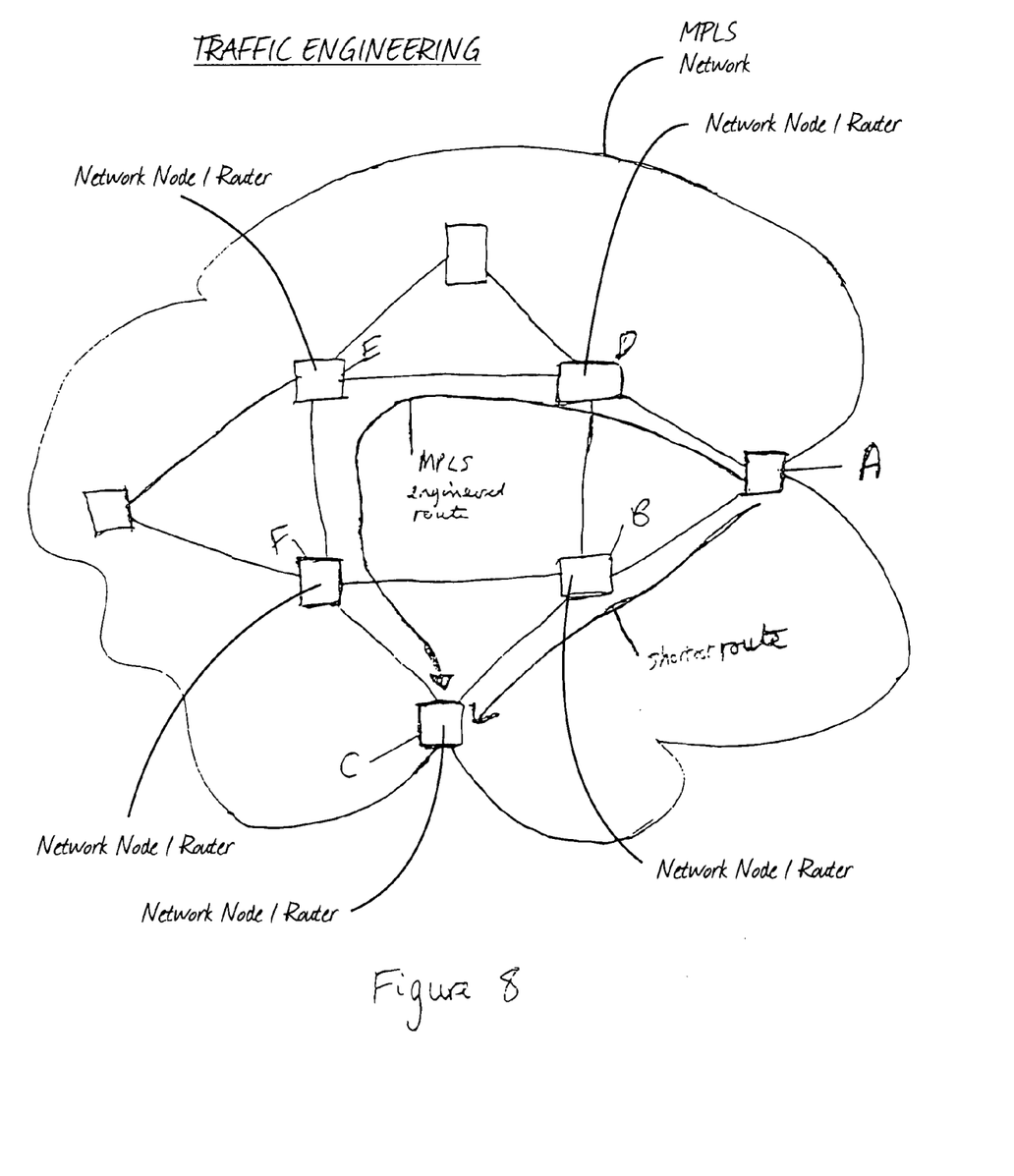
FIG. 8 shows a message being routed through an MPLS network along alternative pathways.

An advantage of MPLS networks is that they can be readily used to engineer network traffic. Traditionally in IP based systems, traffic is always directed along the shortest route. In the network shown in FIG. 8, the shortest route from router A to router C is via router B. A disadvantage of this is, however, that in some circumstances certain parts of the network can be overloaded whilst other parts remain unused. There is no mechanism in traditional IP networks to cause messages to be sent along anything other than the shortest route. In the case of MPLS, however, because the message path is determined by the label switching mechanism, it is relatively straightforward to alter the route taken by signals in the event that network overloading occurs. In the case of FIG. 8, for example, should the forward message route A to B to C become overloaded, the MPLS network can be dynamically altered to divert messages from router A to router C via routers D, E and F, along an MPLS engineered route. This is advantageous.

Figure 9:
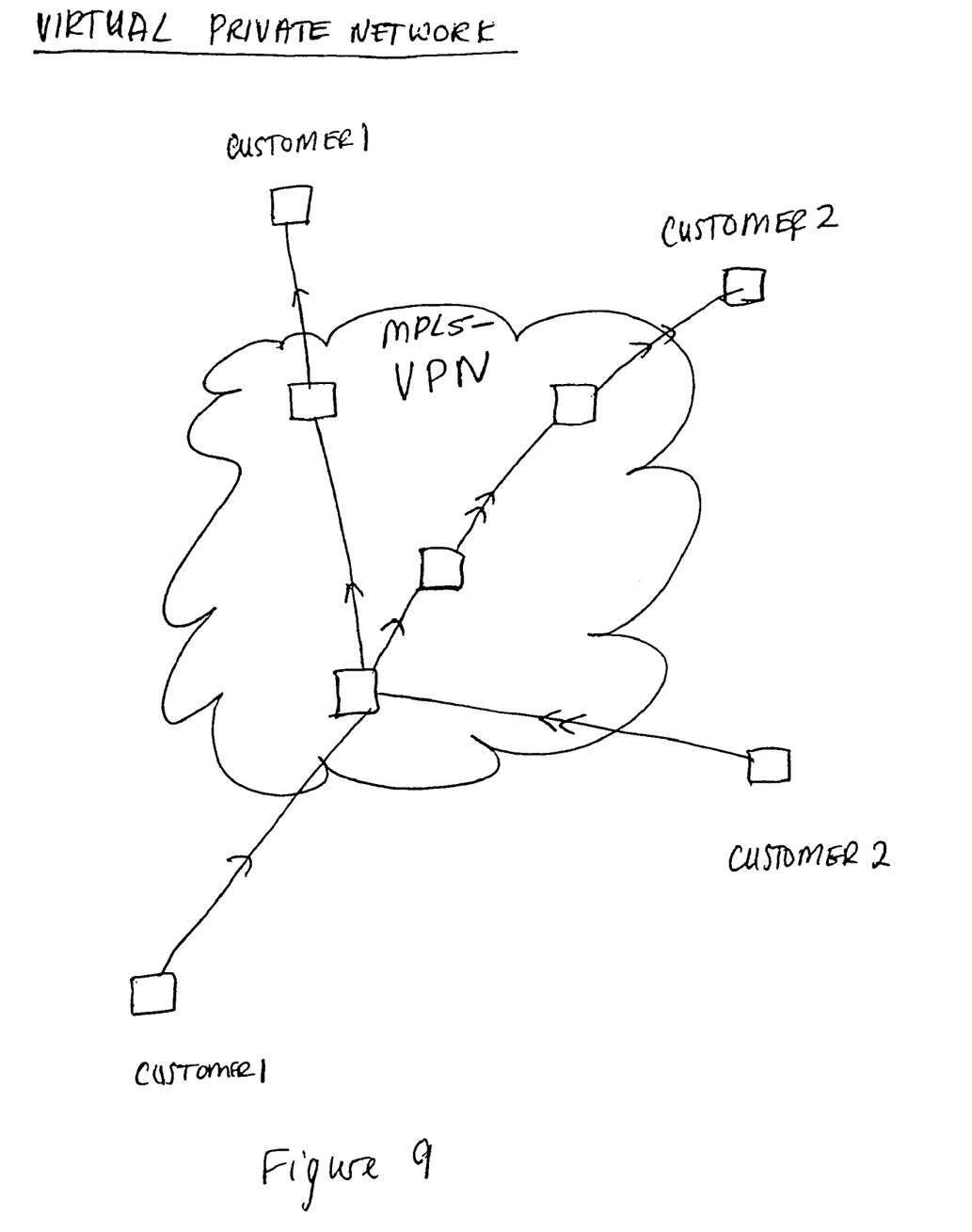
FIG. 9 shows in schematic form multiple customers securing using a MPLS network.

A further advantage of MPLS is that it can be used to establish a virtual private network. This is because once the initial label is identified, re-direction of a message is done on the basis of the label switching mechanism and not on the basis of the IP address. Hence, the IP address can be kept secure. This means that several customers can use the same network infrastructure, as shown in FIG. 9, without compromising security.

Because of the inherent advantages of MPLS, a significant amount of effort has been invested in standardising the MPLS protocols. A disadvantage of MPLS is, however, that it can be difficult to detect and identify label switched routers that are the source of faults. This is because there are at present no developed or standardised mechanisms for returning backward defect indicators to the MPLS source. Various methods to overcome this problem have been suggested. For example, bi-directional label switching protocols have been proposed.

A disadvantage of this is, however, that it requires a significant development of further MPLS standards. Another alternative is to send error messages back via another mechanism such as using the IP control plane. A disadvantage of this is that it may not always be possible to identify the IP address. This is particularly the case in virtual private networks. In addition, it may not always be possible because the label switched path that failed may be unknown or unreachable.

SUMMARY

Various aspects of the present invention are defined in the independent claims. Some preferred features are defined in the dependent claims.

According to one aspect of the present invention, there is provided a method for sending a message via a label switch telecommunications network, in particular an MPLS network, the method comprising:

identifying at a first node a first label attached to the message;
using the first label to identify a second label associated with the first label, the second label defining a forward path for the message;
replacing the first label with the second label;
sending the message and the second label to another node of the network;
sending a return message associated with the said message from the said other node, together with the second label to the first node;
using the second label to identify the first label, the first label defining a return path for the message, and
replacing the second label with the first label.

An advantage of this method is that return messages can be sent along a working data path, but in a reverse direction, without the need for bi-directional LSP routers or any modifications to the protocol used at network nodes. Instead the label switching data structure is itself used to define a return message path.

Preferably, the return message includes a return message identifier, for example, a label, that identifies that the message is a return message.

The step of using the first label to identify a second label may involve searching in a first direction or order a data structure that includes a plurality of labels, thereby to identify the second label associated with the first label. The step of using the second label to identify the first label may involve searching the data structure in a reverse direction or order, thereby to identify the first label.

The data structure may be a label table that includes input labels and corresponding output labels, which output labels define a forward path for messages that are attached to the corresponding input label, the second label being an output label for the forward path.

The return message may be indicative of a fault or defect in the network. Preferably, the return message includes information relating to the location of the fault or defect.

According to another aspect of the present invention, there is provided a method for sending a message via a label switch telecommunications network, in particular an MPLS network, the method comprising:

identifying at a first node a first label attached to the message;
using the first label to identify a second label associated with the first label, the second label defining a forward path for the message;
replacing the first label with the second label;
sending the message and the second label to another node of the network;
receiving a return message from the said other node together with the second label at the first node;
using the second label to identify the first label, the first label defining a return path for the message, and
replacing the second label with the first label.

Preferably, the return message includes a return message identifier, for example, a label, that identifies that the message is a return message.

The step of using the first label to identify a second label may involve searching in a first direction or order a data structure that includes a plurality of labels, thereby to identify the second label associated with the first label. The step of using the second label to identify the first label may involve searching the data structure in a reverse direction or order, thereby to identify the first label.

The data structure may be a label table that includes input labels and corresponding output labels, which output labels define a forward path for messages that are attached to the corresponding input label, the first label being an input label for the forward path of the message and the second label being an output label for the forward path of the message.

The return message may be indicative of a fault or defect in the network. Preferably, the return message includes information relating to the location of the fault or defect.

According to yet another aspect of the present invention, there is provided a return message that is a product of the methods in which the previous aspects of the invention are embodied.

According to a still further aspect of the invention, there is provided a computer program, preferably on a data carrier or a computer readable medium, the computer program being for processing messages at a node in a label switch telecommunications network, in particular an MPLS network, the computer program comprising instructions for:

identifying a first label attached to a message;
using the first label to identify a second label associated with the first label, the second label defining a forward path for the message;
replacing the first label with the second label;
sending the message and the second label to another node of the network;
receiving a return message from the said other node together with the second label;
using the second label to identify the first label, the first label defining a return path for the message, and
replacing the second label with the first label.

Preferably, the return message includes a return message identifier, for example, a label, that identifies that the message is a return message.

The instructions for using the first label to identify a second label may be operable to search in a first direction or order a data structure that includes a plurality of labels, thereby to identify the second label associated with the first label. The instructions for using the second label to identify the first label may be operable to search the data structure in a reverse direction or order, thereby to identify the first label.

The data structure may be a label table that includes input labels and corresponding output labels, which output labels define a forward path for messages that are attached to the corresponding input label, the first label being an input label for the forward path of the message and the second label being an output label for the forward path of the message.

According to a yet further aspect of the invention, there is provided a telecommunications node or router for sending a message in a label switch telecommunications network, in particular an MPLS network, the node or router comprising:

means for identifying a first label attached to a message;

means operable to use the first label to identify a second label associated with the first label, the second label defining a forward path for the message;

means for replacing the first label with the second label;

means for sending the said message and the second label to another node of the network;

means for receiving a return message associated with the said message from the said other node together with the second label;

means operable to use the second label to identify the first label, the first label defining a return path for the message, and means for replacing the second label with the first label.

Preferably, the return message includes a return message identifier, preferably a label, that identifies that the message is a return message.

The means that are operable to use the first label may be operable to use the first label to search in a first direction or order a data structure that includes a plurality of labels, including the first label, thereby to identify the second label associated with the first label. The means that are operable to use the second label to identify the first label may be operable to search the data structure in a reverse direction or order, thereby to identify the first label.

The data structure may be a label table that includes input labels and corresponding output labels, which output labels define a forward path for messages that are attached to the corresponding input label, the first label being an input label for the forward path of the message and the second label being an output label for the forward path of the message.

According to a still further aspect of the present invention, there is provided a return message that is a product of the node or router in which the invention is embodied.

DETAILED DESCRIPTION

Various aspects in which the present invention are embodied will now be described by way of example only and with reference to FIG. 10, which shows a simplified example of mechanism for returning a message along a path in a MPLS network.

Figure 10:
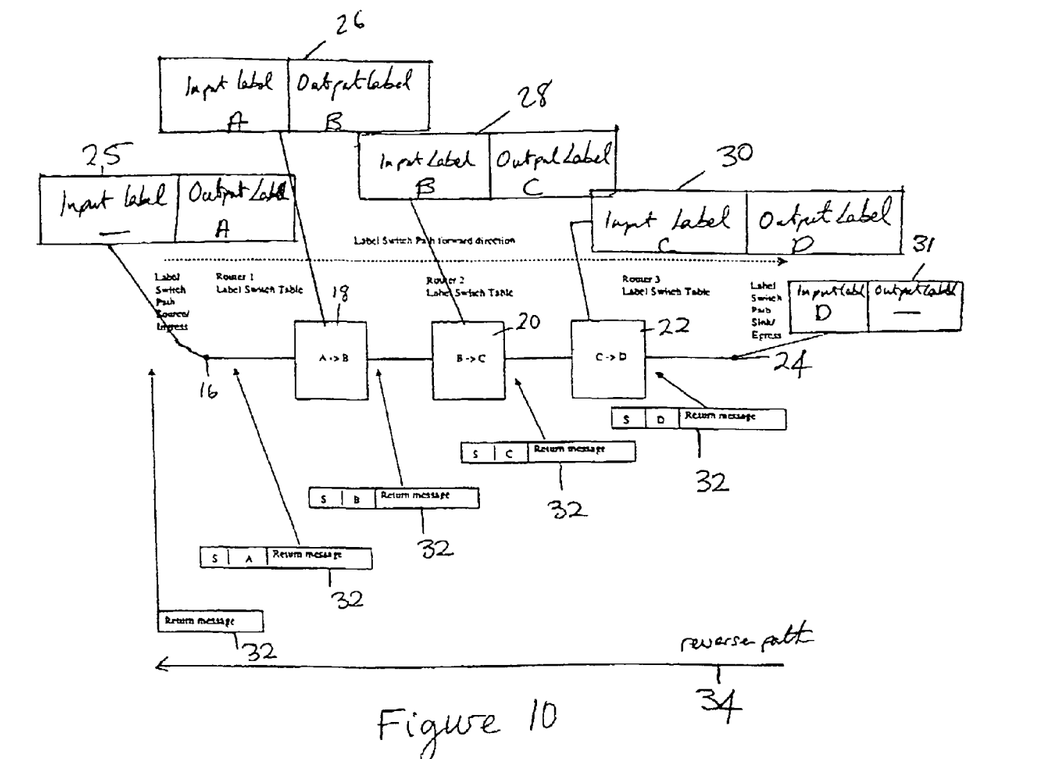
FIG. 10 shows an MPLS network having a source router; label switch routers, and a sink router.

FIG. 10 shows an MPLS network that has a source router 16, a plurality of LSRs 18, 20 and 22 and a sink router 24. Each of the source router, the intermediate LSRs 18, 20 and 22 and the sink router 24 of FIG. 10 includes a label switch table 25, 26, 28, 30 and 31 respectively that has a column of input labels and a column of output labels, each input label being associated with a corresponding output label, which output label defines the forward message path. The label tables 25, 26, 28, 30 and 31 can be interrogated to identify an output label for a forward message path, as is standard in MPLS.

Included in each LSR is software that is adapted to search its label switch table 26, 28 or 30 using an input message label as a search index, thereby to identify an output message label for the forward path, so that the message can be sent to the destination address. As a simple example, when router 18 of FIG. 10 receives a message associated with an input label A, it reads its label table 26 and then switches label A for label B and outputs the message, together with its new label, B, to router 20. When router 20 receives a message associated with a label B, it switches that label for label C and outputs the message, together with its new label, C, to router 22. Likewise, when router 22 receives a message associated with a label C, it switches that for label D and outputs the message, together with its new label, D, to the next router, which is the sink or egress router 24. The sink router 24 pops, i.e. removes, the final label and onward routes the message towards its destination address.

In order to allow a return message associated with the original forward message to be sent from the sink 24 to the source 16 of the original message, the software in each LSR 18, 20 and 22 is adapted to recognise return messages 32 associated with earlier messages. This is done by including an identifier or label in the return message 32. This could be a reserved label value or any other suitable means of identification. In the example shown in FIG. 10, the return message 32 is identified using a reserved label S, which is the first label in the MPLS return message packet. The second label of the return message packet 32, which may be the inner or bottom label, contains the outer label of the original MPLS packet that was received at the sink 24 in the normal forward direction.

In the event that a return message 32 has to be sent along the reverse message path 34 of FIG. 10, an MPLS message packet is constructed and software in the sink router 24 attaches a label S to the message, so that the next router 22 knows that the message is a return message 32. An inner label that defines the path for the return message is also attached to the return message. The inner label is the label that was attached to the original incoming message in the forward direction when it was received at the sink 24. In the case of FIG. 10, the inner label attached to the reverse message is label D. Once the return message label S and the inner label D are attached, the packet 32 that includes the return message, the label D and the reserved label S is then forwarded to router 22.

Included in router 22 is software that is operable to read the label S and recognise this as being indicative of a return message. Also included in router 22 is reverse label handler software, which is used when a message is recognised as being a reverse or return message. This is a software function that is provided in each router and is adapted to search the router label table in a reverse direction or order, thereby to identify a label that defines a reverse message path 34. The reverse handler software is adapted to read the MPLS label table 30 of router 22 backwards, in order to identify a reverse path for the return message. In this way, a return message can be sent by using the input labels as defined in the label table for the forward message path as output labels for the return message path 34.

In the case of the return message 32 of FIG. 10, the reverse handler software is operable to use the label D as a search index and look for label D in the output label column of the label switch table 30. Once label D is found in the output label column, the corresponding input label is identified, in this case label C, and the software swaps the label D for the label C. The label S is then added so that the packet can be identified as a return message and the software pushes the message to router 20.

It will be appreciated that the reverse look up typically has to take into account the interface at which the return message is received on. This is because a single label can be used on more than one interface of a given router.

Once the message is received at router 20, a similar process occurs. The LSR software recognises the label S as an indication that the message is a return message, removes the label S and forwards the remaining MPLS packet to reverse handler software, which reads the label switch table 28 in reverse to identify the label C in the output label column. Doing this, identifies label B as being the next label for the return message path and so label C is removed from the MPLS packet, and label B is added, together with a label S. The resultant data packet is then sent to router 18, where the process is repeated and a return message 32 is sent to the source or ingress router 16.

At the source router 16, a similar process occurs. However, in this case, the reverse look up handler software will not find an entry in its label table 25 that corresponds to label A. The software is adapted to recognise that this means that the return message 32 is intended for processing at the source router 16. The source router 16 then processes the message 32 and routes it to another address based on a label, IP address or other protocol information in the return message. The message that is routed from the LSR will indicate the message is for local processing on the LSR or for return to a client. The client may be IP, another MPLS network layer or another protocol client. In this way, a message can be sent from the source router 16 to the sink router 24 along a forward message path and a return message can be sent from the sink router 24 to the source router 16 along an identical message path, but in the reverse direction.

An advantage of the method for returning messages described above is that it is relatively straightforward to send return messages, without the need to set up bi-directional LSPs. In particular, backward defect indicators (BDI), i.e. return messages that are indicative of faults or defects on the network, can be sent to a message source. The BDIs could include information about faults on the network, in particular information as to the location of the fault, or control messages, such as "slow down data flow rate".

The method of the present invention involves using a label switch data structure, for example a label switch table, to define a forward label switch path for a message and reading the label switch data structure in reverse to allow a return message to be sent back along a reverse path to the source of the original message. This is an efficient process that allows a return message to be sent, with minimum complexity and without having to adapt the existing MPLS protocol standards. This is advantageous.

A skilled person will appreciate that variations of the disclosed arrangements are possible without departing from the invention. Accordingly, the description of the specific embodiments is made by way of example and not for the purposes of limitation. It will be clear to the skilled person that minor modifications can be made without significant changes to the operation described above.

The invention claimed is:

1. A method of operating a node in a label switch telecommunications network, the method comprising:
   storing a data structure indicating, for a working path passing through said node, a forward message input label, a forward message output label and an association therebetween;
   receiving a message at said node;
   identifying an input message label attached to the message;
   replacing the input message label with an output message label;
   sending the message to another node in said network;
   wherein said label replacing comprises:
   determining whether said message is a forward message or a return message; and
   in the case of determining that said message is a forward message:
   i) searching said data structure to find a forward message input label matching said input message label;
   ii) reading said data structure to identify the forward message output label associated with the found forward message input label; and
   iii) replacing the input message label with the identified forward message output label;
   in the case of determining that said message is a return message:
   i) searching said data structure to find a forward message output label matching said input message label;
   ii) reading the same data structure to identify the forward message input label associated with the found forward message output label; and
   iii) replacing the input message label with said forward message input label.

2. A method according to claim 1 in which said label switch telecommunications network comprises a Multiprotocol Label Switching network.

3. A method as claimed in claim 1, wherein the data structure is a label table that includes input labels and corresponding output labels, which output labels define a forward path for messages that are attached to the corresponding input label, wherein the first label is an input label for the forward path of the message and the second label is the corresponding output label for the forward path of the message.

4. A method as claimed in claim 1, wherein the return message includes a return message identifier that identifies that the message is a return message, and said determining comprises recognizing the return message identifier as being indicative of a return message.

5. A method as claimed in claim 4, wherein the return message identifier is a label.

6. A non-transitory computer-readable storage medium tangibly storing thereon an executable computer program, the computer program being executed by a processor to perform a method of processing messages at a node in a label switch telecommunications network, the method comprising:
   storing a data structure indicating, for a working message path passing through said node, a forward message input label, a forward message output label and an association therebetween;
   receiving a message at said node;
   identifying an input message label attached to the message;
   replacing the input message label with an output message label;

sending the message to another node in said network;
wherein said label replacing comprises:
determining whether said message is a forward message or a return message; and
in the case of determining that said message is a forward message:
i) searching said data structure to find a forward message input label matching said input message label;
ii) reading said data structure to identify the forward message output label associated with the found forward message input label; and
iii) replacing the input message label with the identified forward message output label;
in the case of determining that said message is a return message:
i) searching said data structure to find a forward message output label matching said input message label;
ii) reading the same data structure to identify the forward message input label associated with the found forward message output label; and
iii) replacing the input message label with said forward message input label.

7. A non-transitory computer-readable storage medium as claimed in claim 6, wherein the return message includes a return message identifier that identifies that the message is a return message, and said determinating comprises recognizing the return message identifier as being indicative of a return message.

8. A non-transitory computer-readable storage medium as claimed in claim 7, wherein the return message identifier is a label.

9. A telecommunication node or router comprising:
a data structure store having a configuration to indicate, for a working message path passing through said node, a forward message input label, a forward message output label and an association therebetween;
a receiver having a configuration to receive a message at said node;
a label identifier having a configuration to identify an input message label attached to a received message;
a label switch having a configuration to replace the input message label with an output message label;
a transmitter having a configuration to send said message to another node in said network;
wherein said label switch comprises:
a message discriminator having a configuration to determine whether said message is a forward message or a return message;
wherein said label switch is operable, in the case of determining by the message discriminator that said message is a forward message, to:
i) search said data structure store to find a forward message input label matching said input message label;
ii) read said data structure store to identify the forward message output label associated with the found forward message input label; and
iii) replace the input message label with the identified forward message output label;
in the case of determining by the message discriminator that said message is a return message, to:
i) search said data structure store to find a forward message output label matching said input message label;
ii) read said data structure store to identify the forward message input label associated with the found forward message output label; and
iii) replace the input message label with the identified forward message input label.

10. A telecommunication node or router according to claim 9 in which said label switch telecommunications network comprises a Multiprotocol Label Switching network.

11. A telecommunications network that includes a plurality of nodes or routers as defined in claim 9.

12. A node or router as claimed in claim 9, wherein the return message identifier is a label.

13. A telecommunication node or router as claimed in claim 9, wherein the return message includes a return message identifier that identifies that the message is a return message, and said message discriminator comprises a recognizer having a configuration to recognize the return message identifier as being indicative of a return message.

14. A telecommunication node or router as claimed in claim 13, wherein the return message identifier is a label.

15. A method for sending a return message in a label switch telecommunications network that includes a plurality of telecommunication nodes or routers, the method comprising:
receiving, at an interface, a forward message at a node having an input message label;
adding a return message identifier to said forward message to generate a return message having the same input message label; and
sending said return message from the interface on which said forward message was received;
wherein the plurality of telecomunications nodes or routers each comprises:
a data structure store having a configuration to indicate or a working message path passing through said node, a forward message input label, a forward message output label and an association therebetween;
a receiver having a configuration to receive a message at said node;
a label identifier having a configuration to identify an input message label attached to a received message;
a label identifier having a configuration to replace the input message label with an output message label;
a transmitter having a configuration to send said message to another node in said network;
wherein said label switch comprises;
a message discriminator having a configuration to determine whether said message is a forward message or a return message;
wherein said label switch is operable, in the case of determining by the message discriminator that said message is a forward message to;
i) search said data structure store to find a forward message input label matching said input message label;
ii) read said data structure store to identify the forward message output label associated with the found forward message input label; and
iii) replace the input message label with the identified forward message output label;
in the case of determining by the message discriminator that said message is a return message to:
i) search said data structure store to find a forward message output label matching said input message label;
ii) read said data structure store to identify the forward message input label associated with the found forward message output label; and
iii) replace the input message label with the identified forward message input label.

16. A computer comprising:
a processor; and
a non-transitory computer-readable storage medium tangibly storing thereon an executable computer program which is executable by the processor to perform a method of processing messages at a node in a label switch telecommunications network, said method comprising;

storing a data structure indicating, for a working message path passing through said node, a forward message input label, a forward message output label and an association therebetween;

receiving a message at said node;

identifying an input message label attached to the message;

replacing the input message label with an output message label;

sending the message to another node in said network;

wherein said label replacing comprises;

determining whether said message is a forward message or a return message; and in the case of determining that said message is a forward message;

i) searching said data structure to find forward message input label matching said input message label;

ii) reading said data structure to identify the forward message output label associated with the found forward message input label; and iii) replacing the input message label with said forward message output label;

in the case of determining that said message is a return message;

i) searching said structure to find a forward message output label matching said input message label;

ii) reading the same data structure to identify the message input label associated with the found forward message output label; and iii) replacing the input message label with said forward message input label.

* * * * *